Aug. 11, 1953

A. P. STROM ET AL

CIRCUIT INTERRUPTER 2,648,744

Filed March 30, 1950

4 Sheets-Sheet 1

WITNESSES:
N. F. Susser
W. R. Crout

INVENTORS
Albert P. Strom and
Thomas E. Browne, Jr.
BY Ralph H Swingle
ATTORNEY

WITNESSES:
*H. F. Susser*
*W. R. Crout*

INVENTORS
Albert P. Strom and
Thomas E. Browne, Jr.
BY *Ralph H. Swingle*
ATTORNEY Aug. 11, 1953 A. P. STROM ET AL 2,648,744

CIRCUIT INTERRUPTER

Filed March 30, 1950 4 Sheets-Sheet 3

WITNESSES:
H. F. Susser
W. R. Crout

INVENTORS
Albert P. Strom and
Thomas E. Browne, Jr.
BY
Ralph H Swingle
ATTORNEY

Aug. 11, 1953 A. P. STROM ET AL 2,648,744

CIRCUIT INTERRUPTER

Filed March 30, 1950 4 Sheets-Sheet 4

WITNESSES:

H. F. Susser

W. R. Crout

INVENTORS
Albert P. Strom and
Thomas E. Browne, Jr.
BY
Ralph H. Swingle
ATTORNEY Patented Aug. 11, 1953

2,648,744

UNITED STATES PATENT OFFICE 2,648,744

CIRCUIT INTERRUPTER

Albert P. Strom and Thomas E. Browne, Jr., Pittsburgh, Pa., assignors to Westinghouse Electric Corporation, East Pittsburgh, Pa., a corporation of Pennsylvania Application March 30, 1950, Serial No. 152,862

19 Claims. (Cl. 200—149)

Our invention relates to circuit interrupters in general, and more particularly, to arc extinguishing structures therefor.

We have found, as a result of tests on self-generated gas blast circuit interrupters, that there are very marked differences in the characteristics of so-called narrow slot type devices and splitter type devices. The narrow slot interrupter is excellent at low currents, but its interrupting ability at higher currents improves only slightly or not at all. The splitter type of interrupting device, on the other hand, can not interrupt low currents except at very low voltages, but when the current passes a definite value, the voltage that can be interrupted rises very rapidly with increasing current.

It is an object of our invention to provide an arc extinguishing interrupting structure which will combine the good low current performance of the narrow slot type of arc extinguisher with the excellent high current interrupting characteristics of the splitter type of breaker.

Another object is to provide an improved circuit interrupter of the self-generated gas blast type in which the arc is drawn adjacent a side wall of a gas evolving insulating material in which a plurality of closely spaced transverse slots or grooves are provided in the side wall, transversely to the direction of arc establishment to break up the continuity of the side wall surface, to thereby eliminate the possibility of flashover across the surface following a current zero.

Another object is to provide an improved circuit interrupter in which the arc is drawn adjacent to the edges of a plurality of closely spaced insulating gas evolving plates, and to provide a plurality of transverse slots, cuts or grooves in the plates to thereby provide discontinuous surfaces over the plates to increase thereby the value of voltage which may be interrupted by such a type of device.

Still a further object is to provide an improved circuit interrupter of the foregoing type in which biasing means are provided to bias the gas evolving strips or side walls toward each other and against the established arc.

Further objects and advantages will readily become apparent upon reading the following specification taken in conjunction with the drawings in which.

Figure 1:
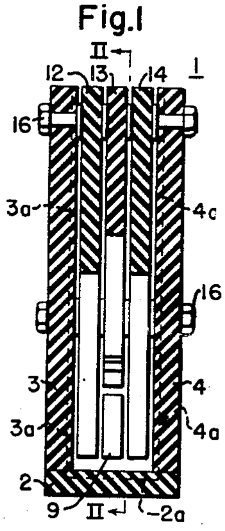
Figure 1 is a cross-sectional view of an interrupter embodying our invention, taken on the line I—I of Fig. 2.

An analysis of the behavior of slot type of interrupters, such as that set forth in United States Patent 2,109,216, issued February 22, 1936, to John W. Huffstutter, indicates that at low currents the arc moves readily along the slot and does not heat any part of the adjacent gas generating material excessively. When current zero arrives, the gaseous part of the arc path is well deionized, and the surface of solid material is also a good dielectric, so that high voltage can be interrupted. However, at high currents, the arc quickly moves to the final position, and while sufficient gas is generated to quickly deionize the gaseous arc path near a current zero, the continuous solid material bounding surface becomes hot and loses much of its dielectric strength. The gas layer adjacent the solid surface is also heated to the surface temperature so that it also has a lowered dielectric strength. Hence, as current increases to high values, the voltage that can be interrupted usually falls.

The cross-blast type of interrupter, on the other hand, does not generate sufficient gas at low currents to cause rapid deionization of the arc core as current zero approaches, so the arc restrikes through the gas core. However, at high currents where the gas core is well deionized, the transverse splitters offer a discontinuous path of solid material surface, so that even though the splitters themselves are hot and therefore have relatively low dielectric strength, the interspaces are deionized and offer high dielectric strength.

We propose to provide similar conditions of discontinuous solid boundary surface in the narrow slot type of breaker, by transversely slotting or grooving the gas generating plates forming the narrow slot walls. Either a single slot may be used, or multiple slots formed by a series of closely spaced gas generating plates having transverse slots or grooves provided therein. Thus, the arc can play between the narrow slot walls as in the conventional narrow slot breaker, but unlike it, the solid surface opposite the arc path is broken up by the transverse slots through the bounding walls or the grooves thereon. Consequently, the low surface breakdown path along the surface joining the electrodes is replaced by a deeply transversely slotted surface which has relatively much higher dielectric strength after the surface has been exposed to a high current arc.

The advantages of such a construction are that low current arc may enter one of the multiple slots and be very close to gas generating walls and hence be quickly deionized. The use of multiple slots permits close spacing of adjacent slot walls for rapid extinction of low currents which enter therebetween, and at the same time, since there are several slots in parallel, the discharge area is sufficient to maintain low pressures at high current.

Another advantage is that heavy current arcs cannot enter the longitudinal slots, but hang at the slot entrance until near current zero when the arc space can be deionized by the continuing gas flow into the slots, or they can move up between a pair of plates and there be extinguished. Consequently, restriking along the surface where the arc originally burned is not likely because of the transverse slots. A few embodiments of our invention illustrating more clearly the foregoing advantages will now be described.

Figure 2:
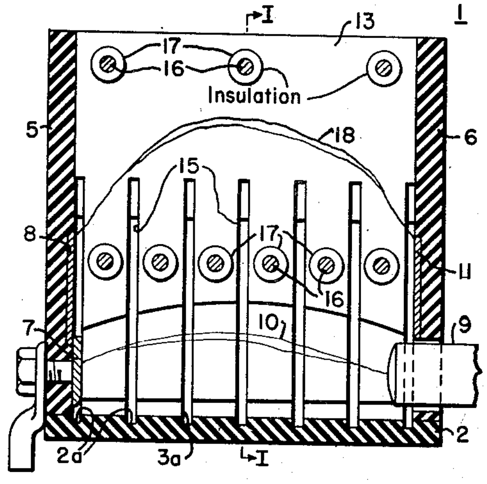
Fig. 2 is a vertical sectional view of our improved arc extinguishing device, taken on the line II—II of Fig. 1, the contacts being shown in the partially open circuit position.

Referring to the interrupter as set forth in Figs. 1 and 2, it will be noticed that we have provided a gas-evolving narrow slot type of arc extinguishing structure generally designated by the reference numeral 1. The extinguisher 1 generally comprises a grooved base plate 2 formed of insulating material having a pair of grooved outer side walls, 3, 4 and a pair of insulating end walls 5, 6. A stationary contact 7 is provided having an up-standing arc horn 8.

Cooperating with the stationary contact 7 is a blade-shaped movable contact 9 which, during the opening operation, establishes an arc 10. Disposed on the inner wall of end plate 6 is a second arc horn 11.

We have provided a plurality, in this particular instance three, side walls 12, 13 and 14 composed of a gas-evolving insulating material, such as fiber, boric acid, horn fiber, or any other suitable material which evolves a gas upon being subjected to an arc.

Each of the side walls 12, 13 and 14 has a plurality of relatively closely spaced transverse slots or cuts 15 provided therein extending upwardly from the lower edges thereof, to thereby bring about discontinuous surfaces adjacent to the established arc 10. The grooves 2*a*, 3*a* and 4*a* have the same function. Preferably the middle plate 13 does not extend as far down as the plates 12, 14 to thereby accommodate lateral separating movement of the movable blade-shaped contact 9 away from the stationary contact 7. The other two side walls 12, 14, preferably extend down to a point immediately adjacent the movable contact 9 so that the established arc 10 will be drawn immediately adjacent thereto.

A plurality of bolts 16 and insulating washers 17 may be employed to affix the several plates in position and to space them the desired distance apart.

The operation of the device will be apparent from the foregoing description. Upon rightward opening motion of the movable contact 9 away from the contact 7 an arc 10 is drawn therebetween. During the interruption of small current arcs, the arc 10 may move in the spaces between the plates 12, 13 and 14 to the position 18 where it extends between the upper ends of the arc horns 8, 11. The movement of the low current arc 18 over the surfaces of the plates 12, 13 and 14 causes the gases within the arc core to be deionized, and at a current zero extinction soon follows. It will be noticed that the arc 18 may rise up either between the side walls 12, 13 or between the slotted side walls 13, 14.

During the interruption of heavy current arcs, the arc tends to remain near the lower end of the extinguisher 1 below the center plate 13. The heavy current arc naturally evolves more gas than does a small current arc, and the evolved gas passing turbulently through the arc stream brings about extinction at a current zero. It will be noticed that the slots or cuts 15 extending transversely of the direction of arc establishment, break up the side wall surfaces to prevent reignition following a current zero.

The embodiment of our invention shown in Figs. 3 and 4 will now be explained. A housing 20 is provided composed of a grooved base plate 2, grooved side walls 3, 4 and end walls 5, 6. As before, there is provided a stationary contact 7 with its immediately adjacent arc horn 8 and a rod-shaped movable contact 9 with the immediately adjacent arc horn 11. Again we groove the base plate 2 by making the cuts or slots 2*a* therein. The side walls 3, 4 again have grooves 3*a* and 4*a* provided therein. This results in a discontinuous surface extending from the stationary contact 7 to the movable contact 9. Also in this embodiment we preferably provide a blast tube 22 which may lead from any suitable source of compressed gas, such as compressed air. The entrance of the compressed air facilitates upward movement of the established arc 10 against the edges of a plurality of plates 23—29 which we provide in this embodiment of our invention.

In certain instances, it may be desirable to provide a pair of magnetic blowout coils 30—31 which act cumulatively and are preferably in series with the electrical circuit controlled by the interrupter. The magnetic field set up by the blow-out coils 30, 31 acts to move the established arc 10 upwardly against the edges of the gas-evolving side plates 23—29. The gas blast may be employed alone or in conjunction with the magnetic field, or alternatively the magnetic field may be utilized alone. Again, stay bolts 16 and washers 17 are provided to maintain the plates 23—29 in proper position and to space them the desired distance apart.

The operation of this embodiment of our invention will now be explained. Upon rightward separating movement of the movable contact 9 away from the stationary contact 7 an arc 10 will be drawn therebetween. Heavy current arc interruption will occur at the lower end of the extinguisher and immediately adjacent the lower ends of the plates 23—29. It will be observed that during such heavy current interruption considerable gas will be evolved from the gas-evolving insulating plates 23—29. The magnetic field and the compressed gas flow may assist in forcing the heavy current arc upwardly against the lower edges of the plates 23—29 to bring about an intimate engagement therewith. Extinction occurs at a current zero when the turbulent gas flow through the arc core deionizes the arc path.

During the interruption of small current arcs, the arc may pass upwardly between a pair of the plates 23—29 to a position 18 where extinction occurs at a current zero because of the cool surfaces encountered by the moving arc. It will be noticed that the cuts or slots 15 provided in all of the plates 23—29 leads to discontinuous surfaces extending along the arc extinguisher in the direction of arc establishment. Further, the grooves 2a, 3a and 4a provided in the base plate 2 and side walls 3, 4 result in discontinuous surfaces extending along the base plate 2 and side walls 3, 4 between the contact 7, 9. As a result, considerable voltage may be withstood following extinction of the arc without there being a possibility of breakdown occurring with subsequent reignition of the arc.

Figure 5:
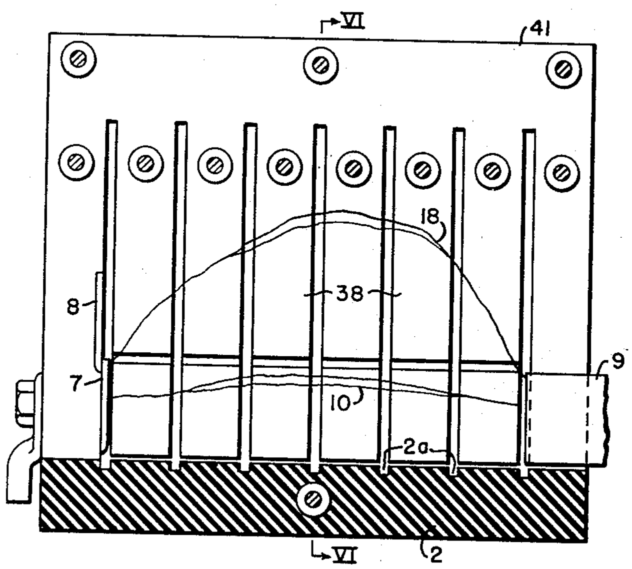
Fig. 5 is a side sectional view of still another embodiment of our invention taken substantially on the line V—V of Fig. 6, the contacts being shown in the partially open circuit position.
Figure 6:
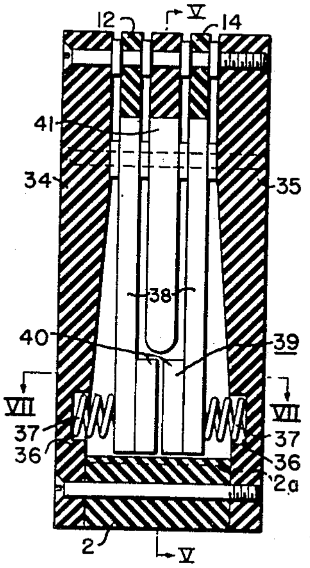
Fig. 6 is a vertical sectional view taken along the line VI—VI of Fig. 5.
Figure 7:
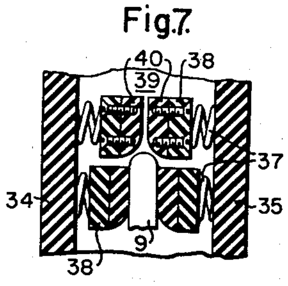
Fig. 7 is a fragmentary sectional view taken along the line VII—VII of Fig. 6.

The embodiment of our invention disclosed in Figs. 5 to 7 is somewhat similar to that heretofore discussed in connection with Figs. 1 and 2. However, it will be noted that the outer side plates 34, 35 have recesses 36 provided therein. The recesses 36 provide seats for compression springs 37 which tend to bias the strips 38 inwardly against each other. The arc 10 is established between pairs of blocks 39, each pair consisting of a block 40 secured to the lower ends of the strips 38. Thus, the opposing blocks 40, formed of a gas-evolving insulating material, biased inwardly against each other by the compression springs 37 tend to squeeze or contract the established arc 10 thereby increasing the evolution of gas from the strips 38. As in Figs. 1 and 2, we provide a central separating splitter 41 which is also composed of gas-evolving material.

Fig. 7 shows how the pairs of blocks 39 may have their edges chamfered to permit easy entrance of the movable contact 9 forcing the blocks 40 apart during the closing operation. During the opening operation, the removal of the movable contact 9 permits the compression springs 37 to force the strips 38 and blocks 40 toward each other contracting the arc 10 and increasing the evolution of gas formed. Light current arcs may pass up between the splitter 41 and either of the side plates 12, 14 to a position 18. The movement of such light current arcs over the cool surfaces results in extinction at an early current zero. Heavy current arcs 10 will remain adjacent the lower end of the extinguisher below the lower edge of the separating splitter 41 where the arc 10 is subjected to the turbulent in-flowing gases resulting from the self-generating action. Extinction occurs at a current zero because of the abundant gas evolution.

The foregoing description of three embodiments of our invention shows how we have provided an improved circuit interrupter of the self-generating gas type in which, by the transverse slots 15 and grooves 2a, 3a and 4a, we have broken up the continuous surfaces to minimize the possibility of voltage breakdown and reignition following arc extinction.

Figure 8:
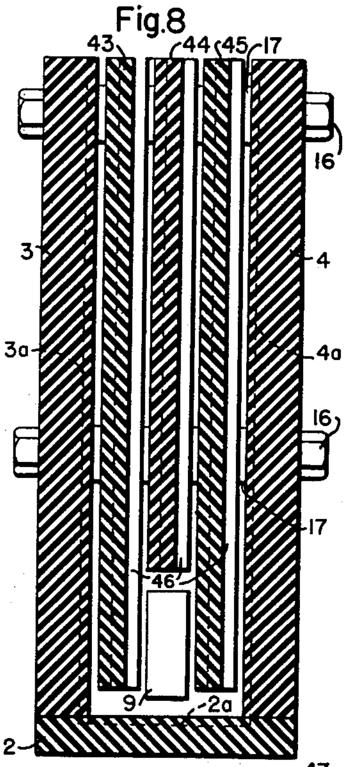
Fig. 8 is a vertical sectional view through a modified type of interrupter similar to the type set forth in Figs. 1 and 2.
Figure 9:
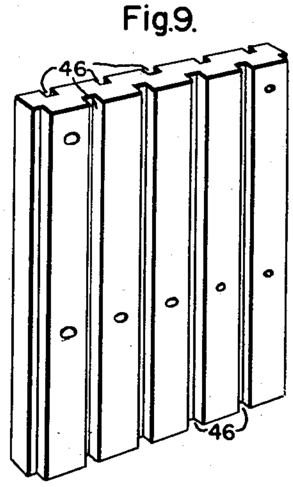
Fig. 9 is a fragmentary perspective view of one of the side walls of the interrupter of Fig. 8.

Fig. 8 shows another embodiment of our invention in which the side walls 43, 44 and 45 are similar to the side walls 12, 13 and 14 heretofore discussed in connection with Figs. 1 and 2, but instead of having slots 15 formed therein, grooves 46 are employed, as more clearly shown in Fig. 9. The grooves 46 are preferably staggered, as shown in Fig. 9, but they might be directly opposite each other on both sides of the plate. However, by having a staggered grooved construction, as shown in Fig. 9, a stronger plate results which is not as readily susceptible to breakage. The other component parts of the interrupter shown in Fig. 8 are then the same as heretofore discussed in connection with Figs. 1 and 2, it merely being noted that instead of a slotted construction being employed, as was the case in Figs. 1 and 2, a grooved construction is here employed.

The arc is drawn in the same manner as in Figs. 1 and 2, and the grooves 46 provide surface discontinuities to increase the dielectric strength across the surface at a current zero.

Figure 3:
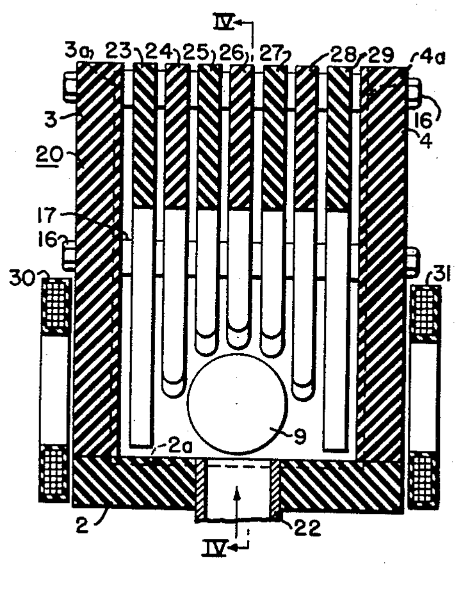
Fig. 3 illustrates a modified form of our arc extinguisher, the view being taken in cross-section along the line III—III of Fig. 4.
Figure 4:
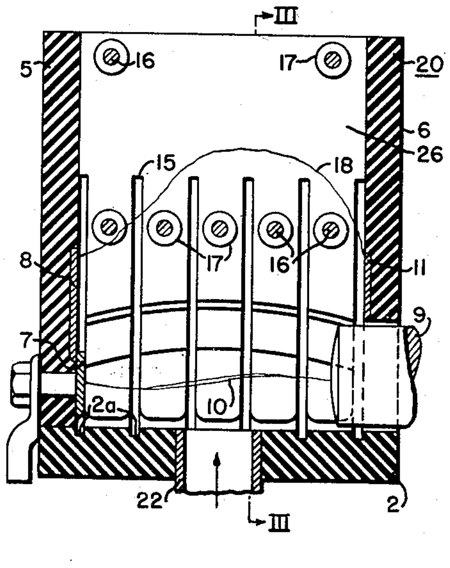
Fig. 4 is a side vertical sectional view of the interrupter of Fig. 3 taken along the line IV—IV of Fig. 3, the contacts being shown in the partially open circuit position.
Figure 10:
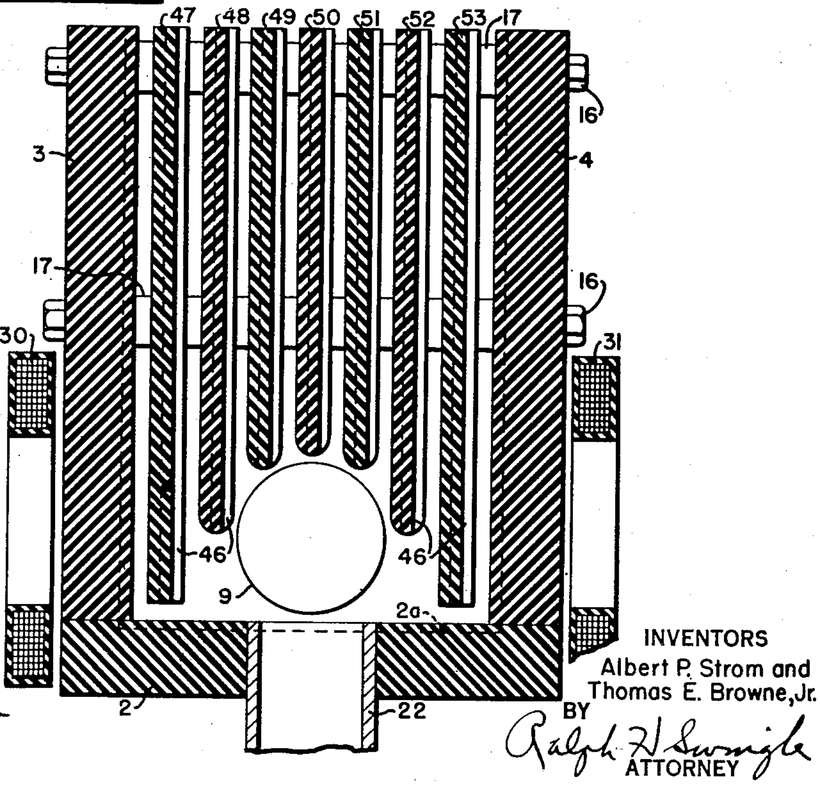
Fig. 10 is a vertical sectional view through a modified type of interrupter similar to the type set forth in Figs. 3 and 4.

Fig. 10 is a modification which is in all respects similar to that shown in Figs. 3 and 4 heretofore discussed, except instead of employing slots 15 in the plates 23, 29, here, grooves 46 are employed in the plates 47—53. Again the series blow-out coils 30, 31 may be employed either alone or in combination with a blast tube 22. The surface grooves 46 on the plates 47—53 may take the form as indicated in Fig. 9. Again the operation is the same as was described heretofore in connection with Figs. 3 and 4, with the exception that surface grooves 46 are employed instead of slots 15 to bring about the surface discontinuities.

Figure 11:
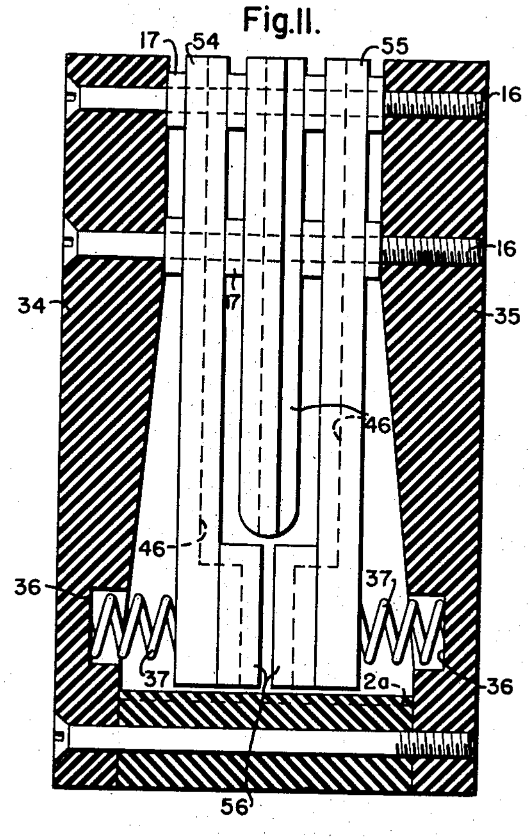
Fig. 11 is a vertical sectional view through a modified type of interrupter similar to that set forth in Figs. 5–7.
Figure 12:
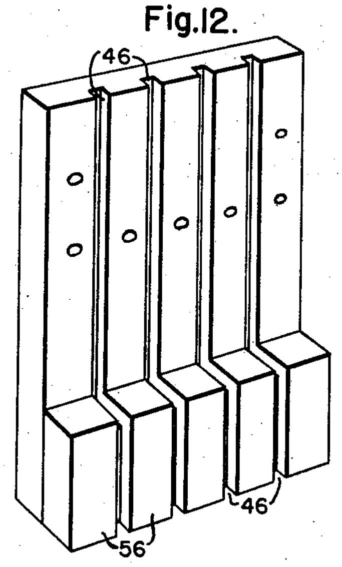
Fig. 12 is a fragmentary perspective view of one of the side walls of the interrupter shown in Fig. 11.

Figs. 11 and 12 collectively show a modified form of the invention which is in all respects similar to that heretofore discussed in connection with Figs. 5–7, with the exception that instead of strips 38 being employed in conjunction with side walls 12, 14, here, a grooved construction is employed. In other words, the side walls 54, 55 have the grooves 46 formed on their inner opposed walls, as shown in Fig. 12, the grooves 46 not only extending vertically along the vertical portions but also along the blocks 56. Compression springs 37 are employed to bias the side walls 54, 55, which are flexible, inwardly.

It will be observed that we have incorporated our device in an interrupter either utilizing an external gas flow or one employing magnetic blow-out coils to provide a magnetic blow-out field. Also it will be observed that we have provided biasing means to bias the strips 38 and blocks 40 inwardly to provide an automatic controlled pressure responsive extinguishing device which accommodates the interruption of low and high currents.

Although we have shown and described specific structures, it is to be clearly understood that the same were merely for the purpose of illustration, and that changes and modifications may readily be made by those skilled in the art without departing from the spirit and scope of the appended claims.

We claim as our invention:

1. A circuit interrupter including a substantially enclosed arc chamber having a normally open vent opening, means for establishing an arc within the arc chamber, a plurality of spaced gas-evolving insulating strips disposed laterally of the arc adjacent the vent opening so that the arc is drawn transversely thereof immediately adjacent thereto, and the evolved gas passing out the vent opening and extinguishing the arc.

2. A circuit interrupter including a substantially enclosed arc chamber having a normally open vent opening, means for establishing an arc within the arc chamber, a plurality of spaced gas-evolving insulating strips disposed laterally of the arc adjacent the vent opening so that the arc is drawn transversely thereof immediately adjacent thereto, the evolved gas passing out the vent opening and extinguishing the arc, and means biasing the strips against the arc.

3. A circuit interrupter including a substantially enclosed arc chamber having a vent opening, means for establishing an arc within the arc chamber, a pair of insulating side walls spaced closely together adjacent the vent opening between which the arc is drawn, and a plurality of relatively deep closely spaced transverse slots in the walls disposed transversely of the direction of arc drawal.

4. A circuit interrupter including a substantially enclosed arc chamber having a vent opening, means for establishing an arc within the arc chamber, a plurality of closely-spaced gas-evolving insulating walls disposed parallel to the direction of arc drawal and adjacent the vent opening, and a plurality of relatively deep slots formed in each wall transversely to the direction of arc drawal.

5. A circuit interrupter including a substantially enclosed arc chamber having a vent opening, means for establishing an arc within the arc chamber, a plurality of closely-spaced insulating walls disposed parallel to the direction of arc drawal and adjacent the vent opening, a plurality of slots formed in each wall transversely to the direction of arc drawal, and means for sending a blast of gas out the vent opening and against the arc to force it against the edges of the walls.

6. A circuit interrupter including a substantially enclosed arc chamber having a vent opening, means for establishing an arc within the arc chamber, a plurality of closely-spaced insulating walls disposed parallel to the direction of arc drawal and adjacent the vent opening, a plurality of slots formed in each wall transversely to the direction of arc drawal, and means providing a magnetic field to move the arc between the walls and toward the vent opening.

7. A circuit interrupter including a substantially enclosed arc chamber having a vent opening, means for establishing an arc within the arc chamber, a plurality of closely-spaced gas-evolving insulating walls disposed parallel to the direction of arc drawal and adjacent the vent opening, a plurality of slots formed in each wall transversely to the direction of arc drawal, and means for biasing two of the walls against each other to more intimately engage the arc.

8. A circuit interrupter including a substantially enclosed arc chamber having a vent opening, means for establishing an arc within the arc chamber, a substantially flat side wall disposed laterally of the arc adjacent the vent opening so that the arc is drawn immediately adjacent thereto, the side wall having a plurality of transverse surface discontinuities transversely of which the arc is drawn, the side wall having a portion thereof formed of a gas-evolving material, and the evolved gas passing out the vent opening and extinguishing the arc.

9. A circuit interrupter including a substantially enclosed arc chamber having a vent opening, means for establishing an arc within the arc chamber, a pair of insulating flat substantially parallel side walls spaced closely together adjacent the vent opening between which the arc is drawn, the side walls being in part formed of a gas-evolving material, and a plurality of closely spaced surface irregularities provided in the walls disposed transversely of the direction of arc drawal.

10. A circuit interrupter including a substantially enclosed arc chamber having a vent opening, means for establishing an arc within the arc chamber, a plurality of closely-spaced gas-evolving flat insulating walls disposed parallel to the direction of arc drawal and adjacent the vent opening, and a plurality of surface discontinuities formed in each wall transversely to the direction of arc drawal.

11. A circuit interrupter including a substantially enclosed arc chamber having a vent opening, means for establishing an arc within the arc chamber, a plurality of closely-spaced gas-evolving flat insulating walls disposed parallel to the direction of arc drawal and adjacent the vent opening, a plurality of surface discontinuities formed in each wall transversely to the direction of arc drawal, and means for sending a blast of gas against the arc to force it against the edges of the walls.

12. A circuit interrupter including a substantially enclosed arc chamber having a vent opening, means for establishing an arc within the arc chamber, a plurality of closely-spaced gas-evolving flat insulating walls disposed parallel to the direction of arc drawal and adjacent the vent opening, a plurality of surface discontinuities formed in each wall transversely to the direction of arc drawal, and means providing a magnetic field to move the arc between the walls.

13. A circuit interrupter including a substantially enclosed arc chamber having a vent opening, means for establishing an arc within the arc chamber, a plurality of closely-spaced gas-evolving flat insulating walls disposed parallel to the direction of arc drawal and adjacent the vent opening, a plurality of surface discontinuities formed in each wall transversely to the direction of arc drawal, and means for biasing two of the walls against each other to more intimately engage the arc.

14. A circuit interrupter including a substantially enclosed arc chamber having a vent opening, means for establishing an arc within the arc chamber, a flat side wall formed of a gas-evolving insulating material having a plurality of surface grooves disposed therein, the side wall being disposed adjacent the vent opening and laterally of the arc so that the arc is drawn transversely of the grooves immediately adjacent to the side wall, and the evolved gas passing out the vent opening and extinguish the arc.

15. A circuit interrupter including a substantially enclosed arc chamber having a vent opening, means for establishing an arc within the arc chamber, a pair of flat gas-evolving insulating side walls spaced closely together adjacent the vent opening between which the arc is drawn, each of the side walls having a plurality of closely-spaced surface grooves provided therein formed substantially transversely to the direction of arc drawal, and the evolved gas passing out the vent opening and extinguishing the arc drawn between the side walls.

16. A circuit interrupter including a substantially enclosed arc chamber having a vent opening, means for establishing an arc within the arc chamber, a pair of flat gas-evolving insulating side walls spaced closely together adjacent the vent opening between which the arc is drawn, each of the side walls having a plurality of closely-spaced surface grooves provided therein formed substantially transversely to the direction of arc drawal, the evolved gas passing out the vent opening and extinguishing the arc drawn between the side walls, and means biasing the pair of side walls toward each other and against the established arc.

17. A circuit interrupter including a substantially enclosed arc chamber having a vent opening, means for establishing an arc within the arc chamber, a plurality of closely-spaced flat gas-evolving insulating walls disposed parallel to the direction of arc drawal and adjacent the vent opening, the insulating walls having a plurality of grooves formed on the surfaces thereof substantially transversely to the direction of arc drawal, and the arc being drawn adjacent the side edges of the insulating walls.

18. A circuit interrupter including a substantially enclosed arc chamber having a vent opening, means for establishing an arc within the arc chamber, a plurality of closely-spaced flat gas-evolving insulating walls disposed parallel to the direction of arc drawal and adjacent the vent opening, the insulating walls having a plurality of grooves formed on the surfaces thereof substantially transversely to the direction of arc drawal, the arc being drawn adjacent the side edges of the insulating walls, and means for sending a blast of gas out the vent opening and against the arc to force it against the edges of the walls.

19. A circuit interrupter including a substantially enclosed arc chamber having a vent opening, means for establishing an arc within the arc chamber, a plurality of closely-spaced flat gas-evolving insulating walls disposed parallel to the direction of arc drawal and adjacent the vent opening, the insulating walls having a plurality of grooves formed on the surfaces thereof substantially transversely to the direction of arc drawal, the arc being drawn adjacent the side edges of the insulating walls, and means providing a magnetic field to move the arc between the walls.

ALBERT P. STROM.
THOMAS E. BROWNE, Jr.

References Cited in the file of this patent

UNITED STATES PATENTS

| Number | Name | Date |
|---|---|---|
| 2,231,576 | Grosse | Feb. 11, 1941 |
| 2,267,399 | Farrer et al. | Dec. 23, 1941 |
| 2,285,643 | Beiersdorf et al. | June 9, 1942 |

FOREIGN PATENTS

| Number | Country | Date |
|---|---|---|
| 403,068 | Germany | Sept. 26, 1924 |